(12) United States Patent
Landis et al.

(10) Patent No.: US 11,330,411 B2
(45) Date of Patent: May 10, 2022

(54) INTER-RADIO ACCESS TECHNOLOGY INTERFERENCE CANCELLATION

(71) Applicant: QUALCOMM Incorporated, San Diego, CA (US)

(72) Inventors: Shay Landis, Hod Hasharon (IL); Assaf Touboul, Netanya (IL); Gideon Shlomo Kutz, Ramat Hasharon (IL); Michael Levitsky, Rehovot (IL); Amit Bar-Or Tillinger, Petach Tikva (IL)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 16/891,804

(22) Filed: Jun. 3, 2020

(65) Prior Publication Data

US 2020/0389771 A1    Dec. 10, 2020

Related U.S. Application Data

(60) Provisional application No. 62/857,370, filed on Jun. 5, 2019.

(51) Int. Cl.
| | | |
|---|---|---|
| *H04W 4/40* | (2018.01) | |
| *H04W 24/10* | (2009.01) | |
| *H04L 5/00* | (2006.01) | |
| *H04W 72/04* | (2009.01) | |
| *H04B 17/336* | (2015.01) | |
| *H04W 84/12* | (2009.01) | |

(52) U.S. Cl.
CPC ............ *H04W 4/40* (2018.02); *H04B 17/336* (2015.01); *H04L 5/0082* (2013.01); *H04W 24/10* (2013.01);
(Continued)

(58) Field of Classification Search
CPC .... H04B 1/7097; H04B 1/713; H04B 17/336; H04B 17/345; H04J 11/0023–0066; H04L 5/0062; H04L 5/0066; H04L 5/0082–0083; H04L 25/03006; H04L 27/2614; H04L 41/145; H04L 43/00; H04L 43/06; H04W 4/40–48; H04W 4/70; H04W 8/005; H04W 16/14; H04W 16/18; H04W 24/02; H04W 24/08; H04W 24/10; H04W 36/00; H04W 36/0083;
(Continued)

(56) References Cited

U.S. PATENT DOCUMENTS

2018/0014146 A1    1/2018 Gulati et al.

OTHER PUBLICATIONS

Ilmari M., et al., "Performance Evaluation of Adaptive Beamforming in 5G-V2X Networks", 2017 European Conference On Networks And Communications (EUCNC), IEEE, Jun. 12, 2017 (Jun. 12, 2017), pp. 1-5, XP033122292, DOI: 10.1109/EUCNC.2017.7980728 [Retrieved on Jul. 13, 2017] p. 2, left-hand column; figure 1.

(Continued)

*Primary Examiner* — Thomas R Cairns
(74) *Attorney, Agent, or Firm* — Danai Nelisile Mhembere; Holland & Hart LLP

(57) ABSTRACT

Methods, systems, and devices for wireless communications are described. The method may include an interference estimation procedure that measures interference from radio access technologies (RATs) different from cellular vehicle to everything (CV2X) on the CV2X network at a user equipment (UE). A UE may record measurements of interference on the CV2X network when no CV2X signal is present during the last symbol of a subframe. Then, the UE may estimate the noise plus interference measured during the empty symbol to improve noise plus interference whitening when decoding a subframe.

30 Claims, 12 Drawing Sheets

(52) U.S. Cl.
CPC ........ *H04W 72/0446* (2013.01); *H04W 84/12* (2013.01)

(58) Field of Classification Search
CPC . H04W 36/0088; H04W 40/24; H04W 52/00; H04W 52/365; H04W 72/0446; H04W 72/08; H04W 72/082; H04W 72/1226; H04W 84/12
See application file for complete search history.

(56) References Cited

OTHER PUBLICATIONS

Intel Corporation: "LTE-V2V Coexistence with DSRC Technology", 3GPP Draft, 3GPP TSG RAN WG1 Meeting #87, R1-1611924 Intel—V2V DSRC, 3rd Generation Partnership Project (3GPP), Mobile Competence Centre, 650, Route Des Lucioles, F-06921 Sophia-Antipolls Cedex, France, vol. RAN WG1, No. Reno. USA, Nov. 14, 2016-Nov. 18, 2016, Nov. 13, 2016 (Nov. 13, 2016), XP051175890, pp. 1-8 Retrieved from the Internet: URL: http://www.3gpp.org/ftp/Meetings_3GPP_SYNC/RAN1/Docs/, [retrieved on Nov. 13, 2016], p. 1, line 31-line 32 p. 1, line 34-line 35 p. 2, line 1-line 6 p. 2, line 18-line 19 p. 2, line 40-line 42 p. 3, line 24-line 29 p. 4, line 3-line 6 p. 4, line 30-line 35.
International Search Report and Written Opinion—PCT/US2020/036163—ISA/EPO—dated Sep. 16, 2020.
Soret B ., et al., "Radio Resource Management for V2V Discovery", 2017 IEEE 85th Vehicular Technology Conference (VTC Spring), IEEE, Jun. 4, 2017 (Jun. 4, 2017), pp. 1-6, XP033254529, DOI: 10.1109/VTCSPRING.2017.8108538 [Retrieved on Nov. 14, 2017], p. 4, right-hand column.

INTER-RADIO ACCESS TECHNOLOGY INTERFERENCE CANCELLATION

CROSS REFERENCE

The present application for patent claims the benefit of U.S. Provisional Patent Application No. 62/857,370 by LANDIS et al., entitled "INTER-RADIO ACCESS TECHNOLOGY INTERFERENCE CANCELLATION," filed Jun. 5, 2019, assigned to the assignee hereof, and expressly incorporated by reference herein.

FIELD OF TECHNOLOGY

The following relates generally to wireless communications and more specifically to inter-radio access technology interference cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for vehicle based communications, also referred to as vehicle-to-everything (V2X) networks, vehicle-to-vehicle (V2V) networks, cellular V2X (CV2X) networks, or other similar networks. During CV2X communications, a UE may decode transmissions generated by a UE operating in the CV2X network. However, in some instances, transmissions from one or more radio access technologies (RATs) different than CV2X may interfere with the transmission in the CV2X network. Under these conditions, the CV2X transmission may be degraded such that the receiving UE may not correctly decode the CV2X transmission.

SUMMARY

The described techniques relate to improved methods, systems, devices, and apparatuses that support inter-radio access technology interference cancellation. Generally, the described techniques provide for an interference estimation process that efficiently measures interference from radio access technologies (RATs) different from cellular vehicle-to-everything (CV2X) such as wireless local area network (WLAN), which may also be referred to herein as WIFI, or Long Term Evolution (LTE). For instance, a UE may take interference measurements when no CV2X signal is transmitted. This may be during the last symbol of a subframe immediately prior to the subframe of interest. For example, UE may assume that no CV2X signal is present in symbol 13 of a subframe and may detect the WIFI interference in that symbol. Then, the UE may estimate the noise plus WIFI interference measured during symbol 13 to improve noise plus interference whitening in the subsequent subframe. In some cases, this estimation and mitigation of interference may occur for every subframe. For example, an estimation may occur at symbol 13 of subframe n−1 and applied to subframe n, an estimation may occur at symbol 13 of subframe n and applied to subframe n+1, and so on. Additionally, a UE may estimate LTE interference for improved decoding of subframe n. For example, the UE may buffer the first thirteen symbols of a subframe (e.g., symbols 0 to 12 of subframe n) and then measure and estimate LTE interference throughout the fourteenth symbol (e.g., symbol 13). The UE may then decode the stored symbols of subframe n based on the LTE interference measurement.

A method of wireless communications by a UE is described. The method may include identifying, within a first transmission time interval (TTI), a symbol period in which a set of wireless devices operating in accordance with a cellular vehicle to everything (CV2X) RAT are configured to refrain from transmitting, measuring interference of a second RAT during the symbol period, the second RAT differing from the CV2X RAT, and decoding a CV2X waveform during the first TTI or a second TTI based on the measured interference.

An apparatus for wireless communications by a UE is described. The apparatus may include a processor, memory coupled with the processor, and instructions stored in the memory. The instructions may be executable by the processor to cause the apparatus to identify, within a first TTI, a symbol period in which a set of wireless devices operating in accordance with a cellular vehicle to everything (CV2X) RAT are configured to refrain from transmitting, measure interference of a second RAT during the symbol period, the second RAT differing from the CV2X RAT, and decode a CV2X waveform during the first TTI or a second TTI based on the measured interference.

Another apparatus for wireless communications by a UE is described. The apparatus may include means for identifying, within a first TTI, a symbol period in which a set of wireless devices operating in accordance with a cellular vehicle to everything (CV2X) RAT are configured to refrain from transmitting, measuring interference of a second RAT during the symbol period, the second RAT differing from the CV2X RAT, and decoding a CV2X waveform during the first TTI or a second TTI based on the measured interference.

A non-transitory computer-readable medium storing code for wireless communications by a UE is described. The code may include instructions executable by a processor to identify, within a first TTI, a symbol period in which a set of wireless devices operating in accordance with a cellular vehicle to everything (CV2X) RAT are configured to refrain from transmitting, measure interference of a second RAT during the symbol period, the second RAT differing from the CV2X RAT, and decode a CV2X waveform during the first TTI or a second TTI based on the measured interference.

In some examples of the method, apparatuses, and non-transitory computer-readable medium described herein, identifying the symbol period may include operations, features, means, or instructions for identifying a preconfiguration or receiving control signaling that configures the UE to refrain from transmitting during the symbol period.

In some examples of the method, apparatuses, and non-transitory computer-readable medium described herein, identifying the symbol period may include operations, features, means, or instructions for identifying that the symbol period may be a last symbol period of the first TTI, the first TTI including a set of symbol periods.

In some examples of the method, apparatuses, and non-transitory computer-readable medium described herein, measuring the interference may include operations, features, means, or instructions for generating, for the symbol period, a set of interference measurements using a set of antennas of the UE, and generating a covariance interference metric based on the set of interference measurements, where the CV2X waveform may be decoded based on the covariance interference metric.

Some examples of the method, apparatuses, and non-transitory computer-readable medium described herein may further include operations, features, means, or instructions for buffering samples of the CV2X waveform generated for a set of symbol periods of the first TTI that occur prior to the symbol period within the first TTI, where the CV2X waveform may be received during the first TTI and decoded based on the buffered samples.

In some examples of the method, apparatuses, and non-transitory computer-readable medium described herein, measuring the interference may include operations, features, means, or instructions for generating an interference power measurement for the symbol period, where the CV2X waveform may be decoded based on the interference power measurement.

In some examples of the method, apparatuses, and non-transitory computer-readable medium described herein, measuring the interference may include operations, features, means, or instructions for generating a noise statistic, an interference statistic, or both, for the symbol period, where the CV2X waveform may be decoded based on the noise statistic, the interference statistic, or both.

In some examples of the method, apparatuses, and non-transitory computer-readable medium described herein, decoding the CV2X waveform may include operations, features, means, or instructions for decoding the CV2X waveform in the second TTI that occurs after the first TTI based on the measured interference.

In some examples of the method, apparatuses, and non-transitory computer-readable medium described herein, the second TTI occurs immediately after the first TTI.

In some examples of the method, apparatuses, and non-transitory computer-readable medium described herein, at least one intervening TTI occurs between the first TTI and the second TTI.

In some examples of the method, apparatuses, and non-transitory computer-readable medium described herein, decoding the CV2X waveform may include operations, features, means, or instructions for applying noise whitening processing to the CV2X waveform based at least in interference measurement.

In some examples of the method, apparatuses, and non-transitory computer-readable medium described herein, decoding the CV2X waveform may include operations, features, means, or instructions for decoding the CV2X waveform in the first TTI.

In some examples of the method, apparatuses, and non-transitory computer-readable medium described herein, measuring the interference may include operations, features, means, or instructions for measuring, for the symbol period, interference of at least one additional RAT, where the CV2X waveform may be decoded based on the measured interference of the at least one additional RAT.

Some examples of the method, apparatuses, and non-transitory computer-readable medium described herein may further include operations, features, means, or instructions for measuring interference within a second symbol period, where the CV2X waveform may be decoded based on the interference measured within the second symbol period.

In some examples of the method, apparatuses, and non-transitory computer-readable medium described herein, measuring the interference may include operations, features, means, or instructions for measuring, during the symbol period, the interference of a WLAN RAT.

In some examples of the method, apparatuses, and non-transitory computer-readable medium described herein, measuring the interference may include operations, features, means, or instructions for measuring, during the symbol period, the interference of an LTE RAT.

In some examples of the method, apparatuses, and non-transitory computer-readable medium described herein, the first TTI may be a subframe.

DETAILED DESCRIPTION

The described techniques relate to improved methods, systems, devices, and apparatuses that support inter-radio access technology interference cancellation. Generally, the described techniques provide for an interference estimation process that efficiently measures interference from radio access technologies (RATs) different from cellular vehicle-to-everything (CV2X). Common interference mitigation approaches estimate channel interference on pilot signals used for channel estimation. This approach may have large complexity and may introduce delay into the system. The large complexity translates to high power consumption, which may be prohibitive for cellular vehicle to everything (CV2X) applications. For instance high power consumption may lead to temperature issues such as increased temperatures that the chip may not be able to withstand.

The present disclosure describes an interference estimation procedure that efficiently measures interference from radio access technologies (RATs) different from CV2X (e.g., WIFI and/or LTE). For instance, a UE may take interference measurements when no CV2X signal is present. This may be during the last symbol of a subframe immediately prior to a subframe of interest. For example, the UE may assume that no CV2X signal is present in symbol 13 of a subframe and may detect the WIFI interference in that symbol. Then, the UE may estimate the noise plus WIFI interference measured during symbol 13 to improve noise plus interference whitening in the subsequent subframe. In some cases, this estimation and mitigation of interference may occur for every subframe. For example, an estimation may occur at symbol 13 of subframe n−1 and applied to subframe n, an estimation may occur at symbol 13 of subframe n and applied to subframe n+1, and so on. Additionally, a UE may estimate LTE interference for improved decoding of subframe n. For example, the UE may buffer the first thirteen symbols of a subframe (e.g., symbols 0 to 12 of subframe n) and then measure and estimate LTE interference throughout the fourteenth symbol (e.g., symbol 13). The UE may then decode the stored symbols of subframe n based on the LTE interference measurement.

The procedure described herein may allow a UE to estimate interference where no CV2X signal is present that leads to a better interference statistics estimation than common methodologies. Additionally, the computation complexity is less than current methodologies, which may improve the speed of communication by not introducing significant latency into the CV2X communications.

Aspects of the disclosure are initially described in the context of a wireless communications system. Aspects of the disclosure are further illustrated by and described with reference to apparatus diagrams, system diagrams, and flowcharts that relate to inter-radio access technology interference cancellation.

Figure 1:
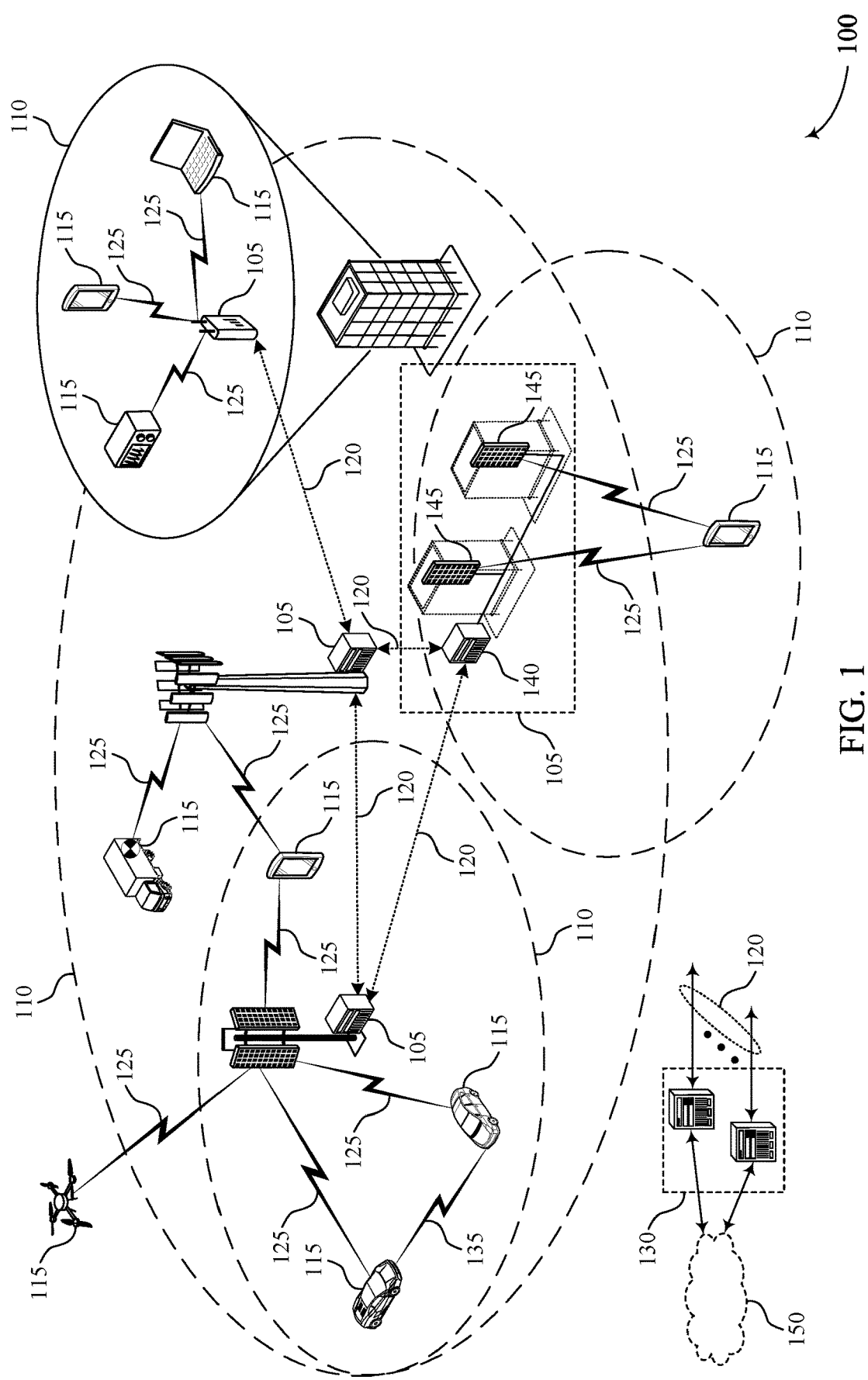
FIG. 1 illustrates an example of a system for wireless communications in accordance with aspects of the present disclosure.

FIG. 1 illustrates an example of a wireless communications system 100 that supports inter-radio access technology interference cancellation in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

An interference estimation procedure that efficiently measures interference from radio access technologies (RATs) different from CV2X (e.g., WIFI and/or LTE) may be performed at UE 115. For instance, UE 115 may take interference measurements when no CV2X signal is present during the last symbol of a subframe immediately prior to the subframe of interest. For example, UE 115 may assume that no CV2X signal is present in symbol 13 of a subframe and may detect the WIFI interference in that symbol. Then, UE 115 may estimate the noise plus WIFI interference measured during symbol 13 to improve noise plus interference whitening in the following subframe. For example, an estimation may occur at symbol 13 of subframe n−1 and applied to subframe n, an estimation may occur at symbol 13 of subframe n and applied to subframe n+1, and so on. Additionally, UE 115 may estimate LTE interference for improved decoding of subframe n. For example, UE 115 may buffer the first thirteen symbols of a subframe (e.g., symbols 0 to 12 of subframe n) and then measure and estimate LTE interference throughout the fourteenth symbol (e.g., symbol 13). UE 115 may then decode the stored symbols of subframe n based on the LTE interference measurement.

Figure 2:
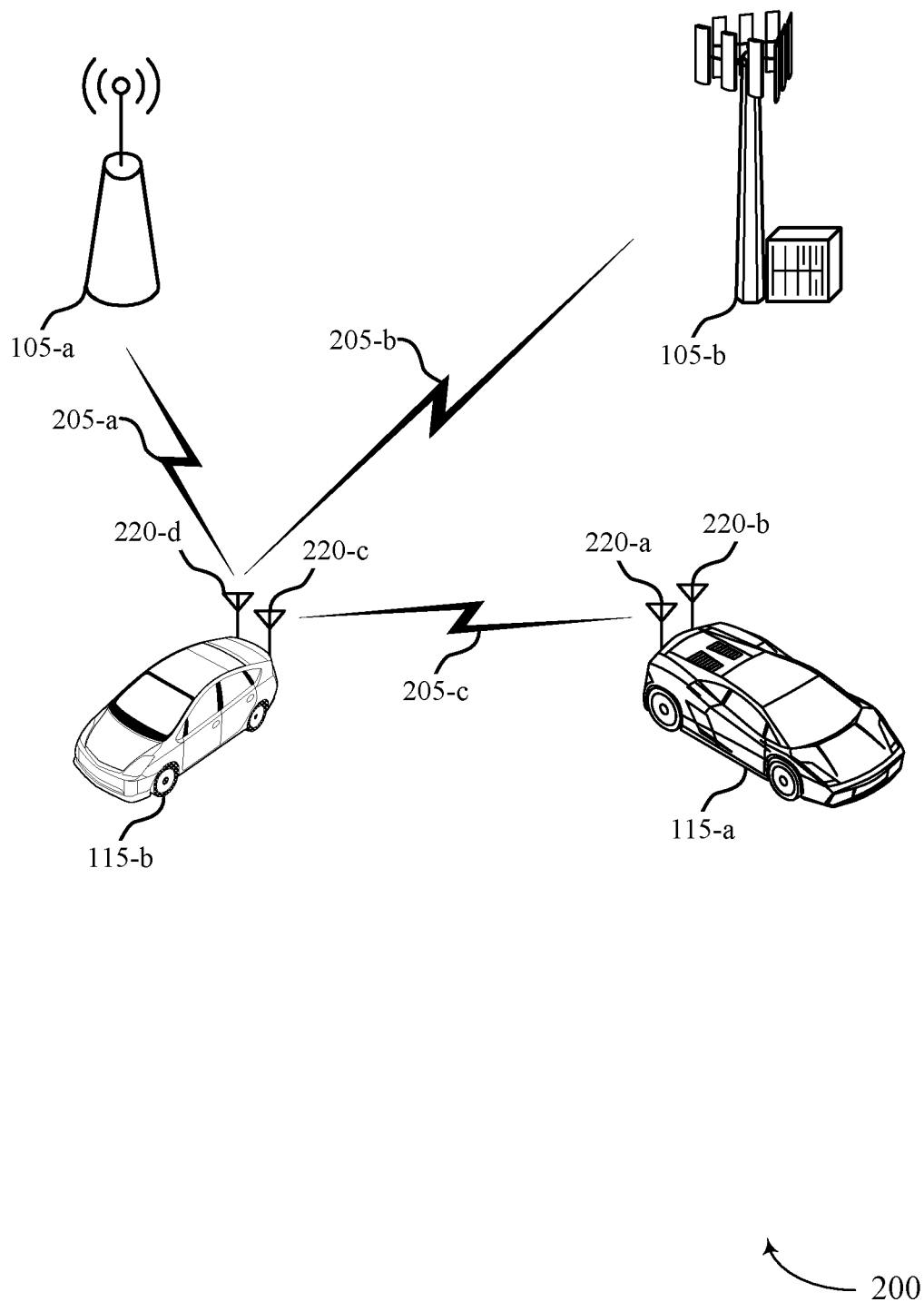
FIG. 2 illustrates an example of a system for wireless communications in accordance with aspects of the present disclosure.

FIG. 2 illustrates an example of a wireless communications system 200 that supports inter-radio access technology interference cancellation in accordance with aspects of the present disclosure. In some examples, wireless communications system 200 may implement aspects of wireless communications system 100. Wireless communications system 200 may include base stations 105-a and 105-b, and UEs 115-a and 115-b, which may be examples of corresponding base stations 105 and UEs 115, respectively, as described herein with reference to FIG. 1.

In some cases, UE 115-a may communicate with UE 115-b (e.g., a data transmission) using the CV2X network (e.g., sidelink communication via CV2X) on antennas 220-a and 220-c via link 205-c. UE 115-a and UE 115-b may be capable of communicating on an additional RAT with base station 105-a (e.g., an access point that operates in accordance with a wireless local area network (WLAN) RAT such as WIFI) and/or with base station 105-b (e.g., a base station that operates in accordance with an LTE RAT). For instance, base station 105-a may communicate with UE 115-b on antenna 220-d via link 205-a. Additionally or alternatively, base station 105-b may communicate with UE 115-b on antenna 220-d via link 205-b.

In some cases, a transmission (e.g., 205-a) from base station 105-a (e.g., a WLAN AP) may interfere with the CV2X communication between UE 115-a and 115-b on link 205-c. The interfering transmission may be transmitted to UE 115-b or to another UE 115 not shown, which may or may not be in communication with UE 115-a. According to aspects of this disclosure, CV2X may be operate in the Intelligent Transport System (ITS) band that neighbors one or more frequency bands used for the WLAN RAT (e.g., one or more WIFI channels may be close in frequency to the ITS band). In some cases, the WIFI channel TTI may not be aligned in time with the CV2X channel TTI, and WIFI transmissions may not be synchronous with CV2X transmissions. In some cases, interference from the WIFI channels of base station 105-a may leak into a CV2X frequency band used for link 205-c. This interference may impact the CV2X receiver's (e.g., UE 115-a or UE 115-b) performance by degrading the signal quality (e.g., SNR) of one or more CV2X transmissions.

It may be beneficial to estimate the interference from base station 105-a on link 205-c at antenna 220-a to improve signal quality of the CV2X transmission on link 205-c. However, estimating the interference inside of a CV2X subframe may complicated, consume a large amount of power, and may result in delays of the communication between UE 115-a and 115-b.

Additionally, a transmission (e.g., 205-b) from base station 105-b (e.g., an LTE base station) may interfere with the CV2X communication between UE 115-a and 115-b on link 205-c. The interfering transmission may be transmitted to UE 115-b or to another UE 115 not shown, which may or may not be in communication with UE 115-a. In some cases, interference from the LTE channels of base station 105-b may leak into a CV2X frequency band used for link 205-c. This interference may largely impact the CV2X receiver's (e.g., UE 115-a or UE 115-b) performance by degrading the signal quality (e.g., SNR) of one or more CV2X transmissions. Therefore, it may also be beneficial to estimate the interference from base station 105-b on link 205-c at antenna 220-a to improve signal quality of the CV2X transmission on link 205-c. However, estimating the interference of an LTE channel on a CV2X subframe may be complicated due to the rapid change of waveforms on the LTE channel on link 205-b. For example, a new waveform may be present in each LTE subframe.

A procedure for estimating WIFI interference (e.g., from base station 105-a) statistics and/or optionally LTE interference (e.g., from base station 105-b) statistics on CV2X (e.g., sidelink communication on link 205-c) with low complexity is described herein. The estimation may occur during a time period when CV2X transmissions are not transmitted. In some examples, the interference estimation procedure may generate a covariance interference metric (e.g., covariance matrix) to define and then cancel interference. For instance, a two by two covariance matrix R, as shown in equation 1, may be generated for the noise plus interference (e.g., WIFI interference) of a frequency of CV2X based on measurements taken when no CV2X communications occurred at two receive antennas of UE 115-a.

$$R = \begin{bmatrix} r_{11} & r_{12} \\ r_{21} & r_{22} \end{bmatrix} \quad (1)$$

In matrix R, the covariance between an interfering signal and a CV2X signal may be measured at a number of receiver antennas (e.g., two antennas 220-a and 220-b). The mean of the absolute squared values of diagonal elements $r_{11}$ and $r_{22}$ may represent the sum of the power of the detected noise plus interference received at antennas 220-a and 220-b. The off diagonal elements $r_{12}$ and $r_{21}$ may represent the conjugate multiplicative at each receiver antenna per time sample. The matrix may be applied by UE 115-a and/or 115-b to whiten the noise plus interference on the receiver antennas (e.g., antennas 220-a and 220-b or 220-c and 220-d) for CV2X communications between UEs 115-a and 115-b. The whitening of the noise plus interference may allow UE 115-a to improve the performance of CV2X communication link 205-c with UE 115-b by increasing the success of decoding received CV2X transmissions at UE 115-a. The estimation and/or whitening of interference may be applied to one or more CV2X subframes based on the variance of interference. Additionally, the UE 115-a may generate UE 115-a and/or 115-b may also generate statistics by monitoring noise and/or interference (e.g., WIFI interference, LTE interference, or both) over time, and use generated the generated statistics for noise cancellation. The statistics may include, for example, average noise power, average interference power, or the like.

Figure 3:
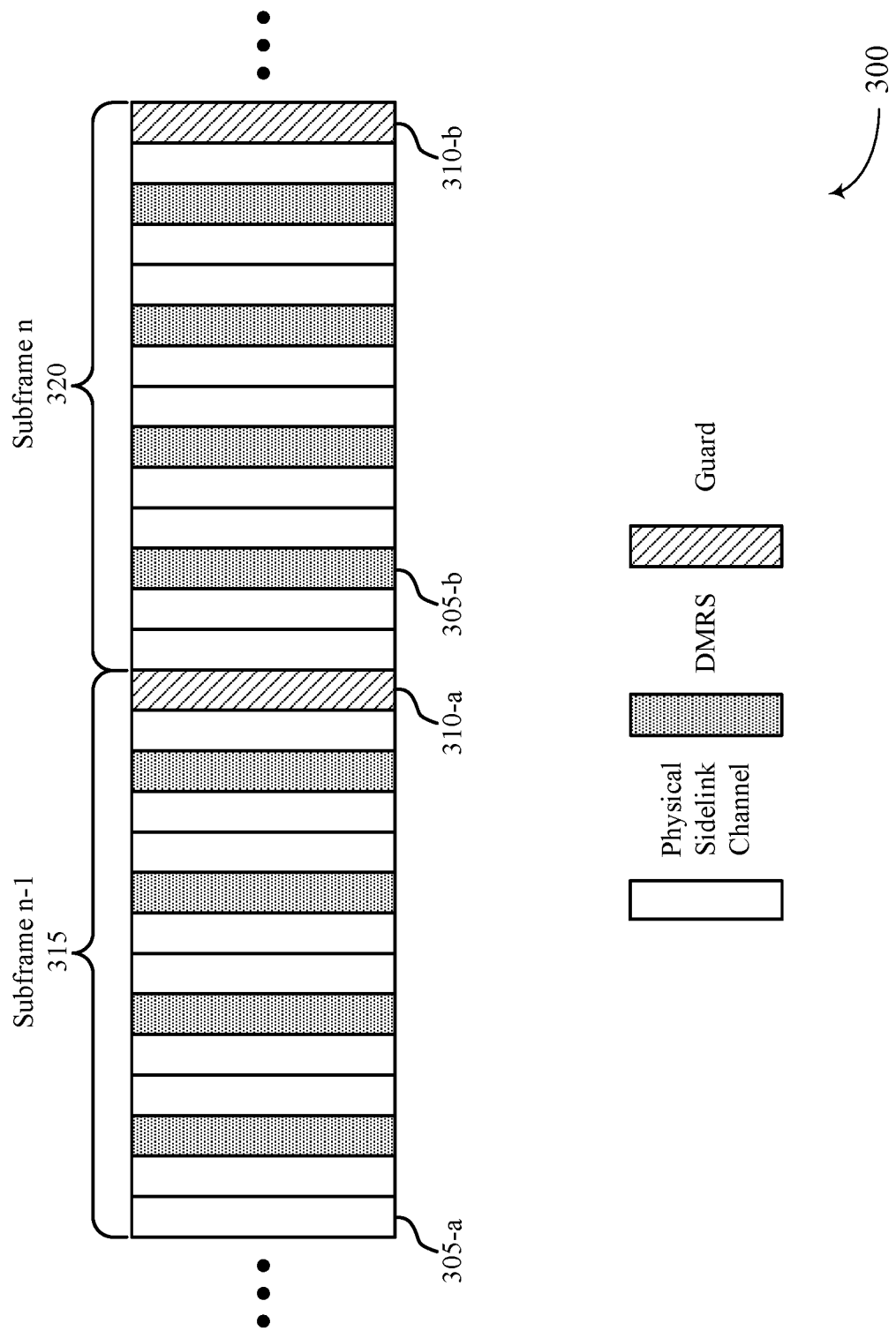
FIG. 3 illustrates an example of a subframe structure in accordance with aspects of the present disclosure.

FIG. 3 illustrates an example of a subframe structure 300 that supports inter-radio access technology interference cancellation in accordance with aspects of the present disclosure. In some examples, subframe structure 300 may implement aspects of wireless communications systems 100 and/or 200. The subframe structure 300 may include CV2X subframe n-1 315 and CV2X subframe n 320. Although not explicitly shown, additional subframes may be present in subframe structure 300.

Subframe n-1 315 and subframe n 320 may each include 14 symbols. In some examples, the first two symbols of subframe n-1 315 and subframe n 320 may include physical sidelink channels 305-a. Assuming the symbols are numbered zero to thirteen, symbols two, five, eight, and eleven may include demodulation reference signals (DMRS). The remaining symbols of subframe n-1 315 and subframe n 320 may include physical sidelink channels 305-a, except for the last symbol 310. Symbol 310 may be a guard symbol for each subframe n-1 315 and subframe n 320 when no CV2X transmissions occur. It may be in this guard symbol 310 that the estimation procedure described herein may take place.

In some cases, a UE may know that CV2X waveforms in symbol 13 in a subframe does not have data (e.g., the subframe is empty of CV2X transmissions) to allow transmitter-receiver turnaround and downlink timing adjustments. Since the ITS band may solely be used for CV2X communications, and all CV2X wireless devices (e.g., UEs) are synchronized in subframe timing with GPS, a UE may safely assume that no CV2X signal is present in symbol 13 (e.g., symbol 310). A UE may detect the WIFI interference in symbol 13 (e.g., symbol 310) of the subframe (e.g., subframe n-1 315) before the subframe (e.g., subframe n 320) in which the CV2X signal is decoded since WIFI is not synchronous with CV2X. For example, a UE may estimate noise plus WIFI interference during symbol 310-a of subframe n-1 315 and use the estimate to improve noise plus interference whitening in subframe n 320. In some cases, a UE may apply the noise plus interference whitening to more than one subsequent subframe when the interference (and noise) is within a threshold of the measurement at symbol 310-a. In some cases, this estimation and mitigation of interference may occur every subframe. For example, an estimation may occur at symbol 310-a and applied to subframe n 320 and an estimation may occur at 310-b to be applied to subframe n+1, and so on.

Additionally, a UE may estimate LTE interference on subframe n. For example, the UE may buffer the first thirteen symbols of a subframe (e.g., symbols 0 to 12 of subframe n) and then measure and estimate LTE interference during the fourteenth symbol (e.g., symbol 13, symbol 310-b). The UE may then decode the buffered symbols of subframe n based on the LTE interference measurement at symbol 310-b. In some examples, the LTE interference estimate at symbol 310-b may be combined with the noise plus WIFI interference estimate at symbol 310-a to improve decoding of subframe n 320. In some cases, the UE may make an additional WIFI plus noise measurement at symbol 310-b to the measurement at 310-a. These interference measurements may be used individually or in combination for the whitening estimation of subframe n. Similarly, an additional LTE interference measurement may be made at symbol 310-a to be used with the measurement at 310-b, which may be used individually or in combination for the whitening estimation of subframe n.

Figure 4:
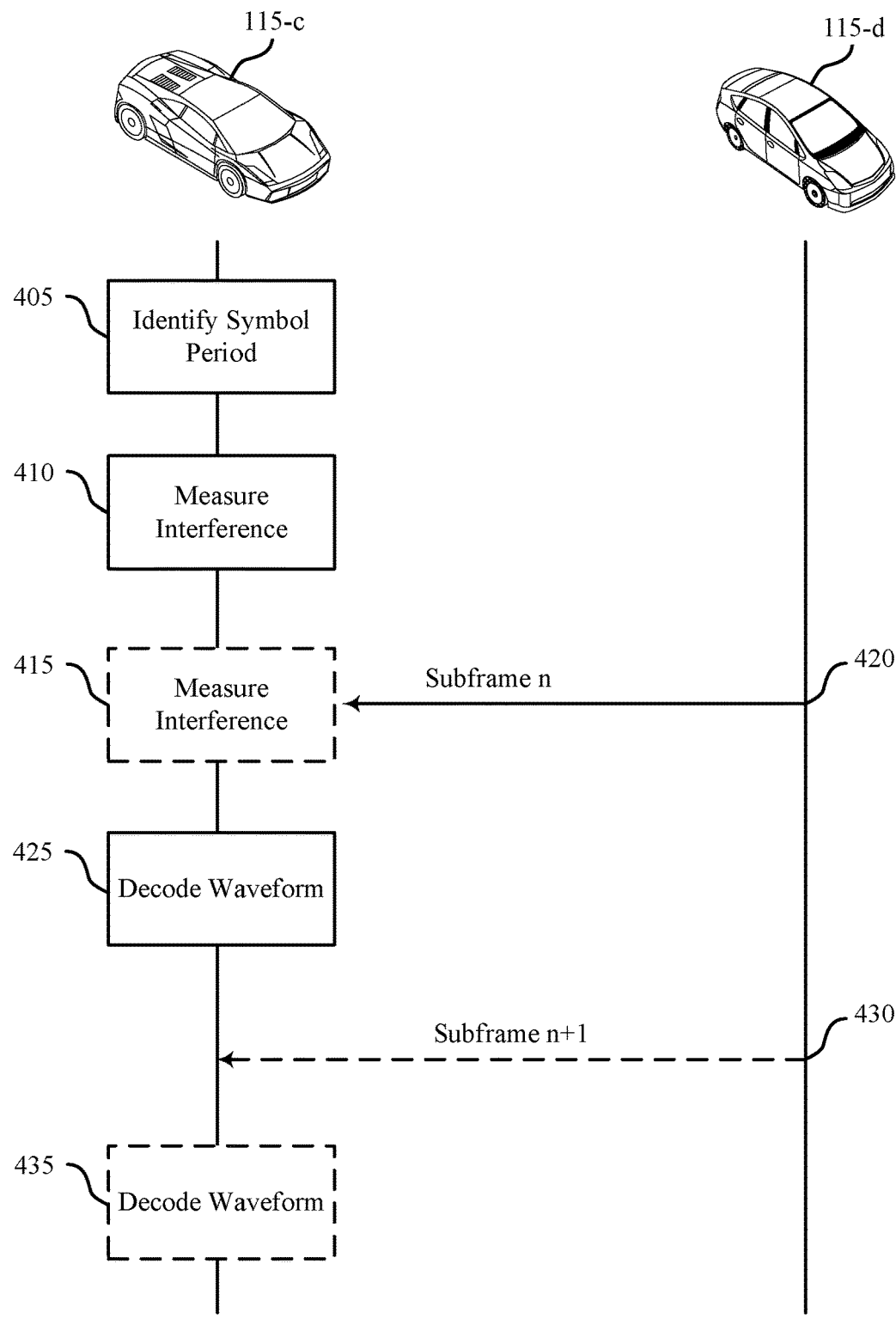
FIG. 4 illustrates an example of a process flow in accordance with aspects of the present disclosure.

FIG. 4 illustrates an example of a process flow 400 that supports inter-radio access technology interference cancellation in accordance with aspects of the present disclosure. In some examples, process flow 400 may implement aspects of wireless communications systems 100 and/or 200. Process flow 400 may include UE 115-c and UE 115-d, which may be examples UEs 115 as described herein with reference to FIGS. 1-3.

In the following description of the process flow 400, the operations between UE 115-c and UE 115-d may be transmitted in a different order than the order shown, or the operations performed by UE 115-c and UE 115-d may be performed in different orders or at different times. Certain operations may also be left out of the process flow 400, or other operations may be added to the process flow 400. It is to be understood that while UE 115-c and UE 115-d are shown performing a number of the operations of process flow 400, any wireless device may perform the operations shown.

At 405, UE 115-c may identify, within a first TTI, a symbol period in which a set of wireless devices operating in accordance with a CV2X RAT (e.g., UE 115-c and UE 115-d) are configured to refrain from transmitting. The UE 115-c may, for example, identify the symbol period as being indicated in a preconfiguration, such as from a technical specification, for the CV2X RAT. The preconfiguration may be locally stored in a memory or other storage device of the UE 115-c. In some examples, the UE 115-c may identify the symbol period as being indicated in receive control signaling (e.g., RRC signaling) received from a serving base station that configures the UE 115-c to refrain from transmitting during the symbol period.

At 410, UE 115-c may measure interference of a second RAT during the symbol period, the second RAT differing from the CV2X RAT (e.g., a WLAN RAT). In some examples, the symbol period may be the last symbol of the first TTI (e.g., a subframe of 14 symbols). Measuring interference at 410 may optionally include generating, for the symbol period, a plurality of interference measurements using a plurality of antennas of the UE and generating a covariance interference metric based on the plurality of interference measurements, where the CV2X waveform is decoded based on the covariance interference metric.

At 415, UE 115-c may optionally measure, for the symbol period, interference of at least one additional RAT differing from the CV2X RAT (e.g., an LTE RAT). In some examples, the symbol period may be the last symbol of the first TTI (e.g., a subframe) and/or at least a portion of subframe n. Measuring interference at 415 may optionally include generating, for the symbol period, a plurality of interference measurements using a plurality of antennas of the UE, and generating a covariance interference metric based on the plurality of interference measurements, where the CV2X waveform is decoded based on the covariance interference metric. In some examples, the covariance interference metric may be based on the measurements of interference at 410 and 415. For instance, the covariance interference metric may be based on WLAN interference and LTE interference.

At 420, UE 115-d may transmit subframe n to UE 115-c. Subframe n may occur immediately after the first TTI, which measurement 410 was taken. In some cases, subframe n may occur immediately before subframe n+1. Subframe n may include control signaling (e.g., DMRS) and/or data.

At 425, UE 115-c may decode a CV2X waveform during the first TTI or a second TTI based on the measured interference at 410 and optionally the measured interference of the at least one additional RAT at 415. In some examples, UE 115-c may apply noise whitening processing to the CV2X waveform based on the interference measurement at 410 and optionally the interference measurement at 415.

At 430, UE 115-d may optionally transmit subframe n+1 to UE 115-c. Subframe n+1 may occur immediately after subframe n. Subframe n+1 may include control signaling (e.g., DMRS) and/or data.

At 435, UE 115-c may optionally decode a CV2X waveform during a third TTI based on the measured interference at 410 and optionally the measured interference of the at least one additional RAT at 415. In some examples, UE 115-c may apply noise whitening processing to the CV2X waveform based on the interference measurement from a previous measurement (e.g., taken at 410 and/or 415). In some cases, UE 115-c may optionally measure interference within a second symbol period (e.g., subframe n), where the CV2X waveform of subframe n+1 is decoded based on the interference measured within the second symbol period (e.g., subframe n).

Figure 5:
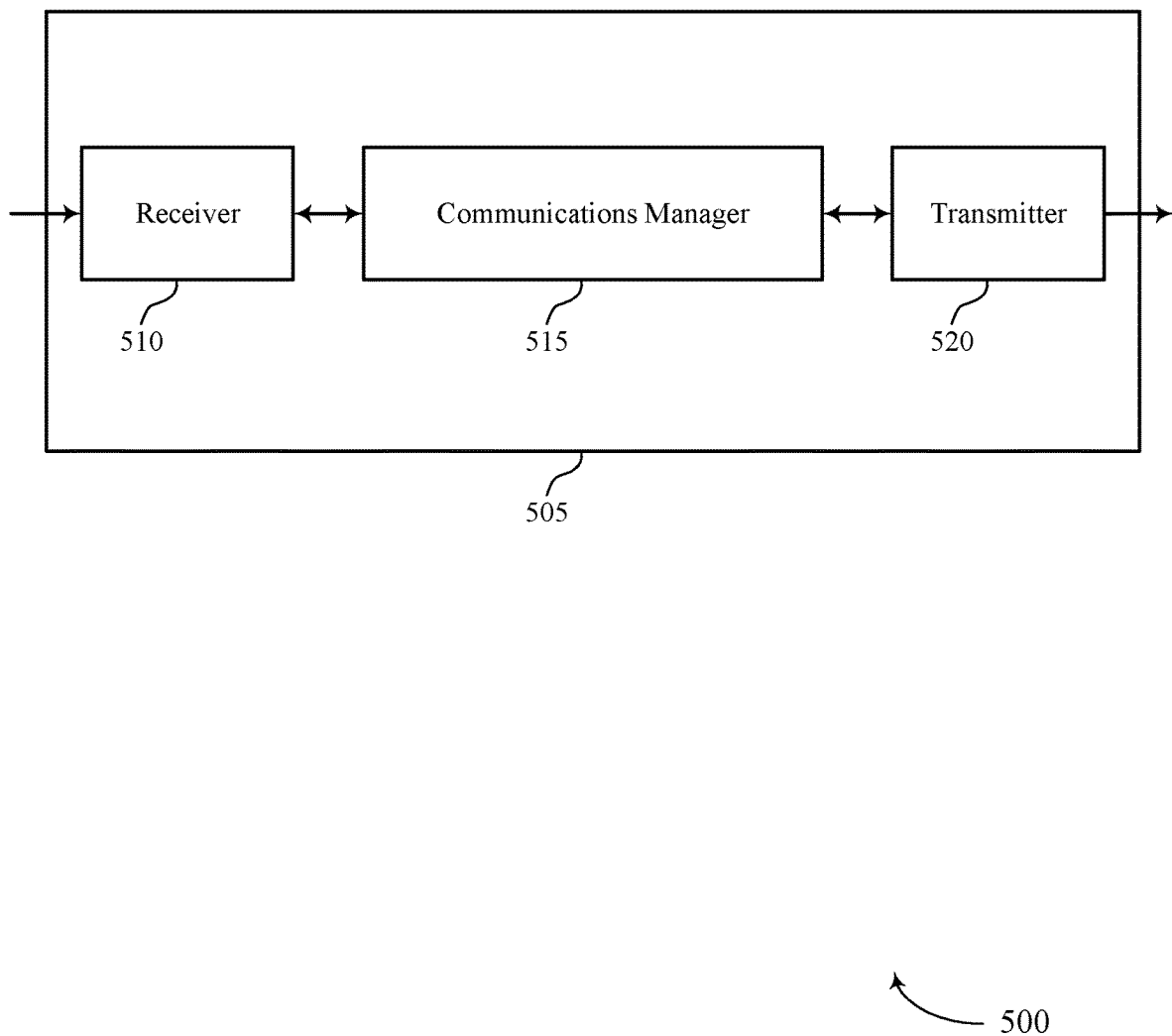
FIGS. 5 and 6 show block diagrams of devices in accordance with aspects of the present disclosure.

FIG. 5 shows a block diagram 500 of a device 505 that supports inter-radio access technology interference cancellation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to inter-radio access technology interference cancellation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify, within a first TTI, a symbol period in which a set of wireless devices operating in accordance with a cellular vehicle to everything (CV2X) RAT are configured to refrain from transmitting, measure interference of a second RAT during the symbol period, the second RAT differing from the CV2X RAT, and decode a CV2X waveform during the first TTI or a second TTI based on the measured interference. The communications manager 515 may be an example of aspects of the communications manager 810 described herein. The actions performed by the communications manager 515 as described herein may be implemented to realize one or more potential advantages. One implementation may allow a UE 115 to save power and reduce interference cancellation computational complexity by avoiding having to perform interference measurements when CV2X signals are present. Another implementation may provide improved quality and reliability of service at the UE 115, as latency and interference at the UE 115 may be reduced.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
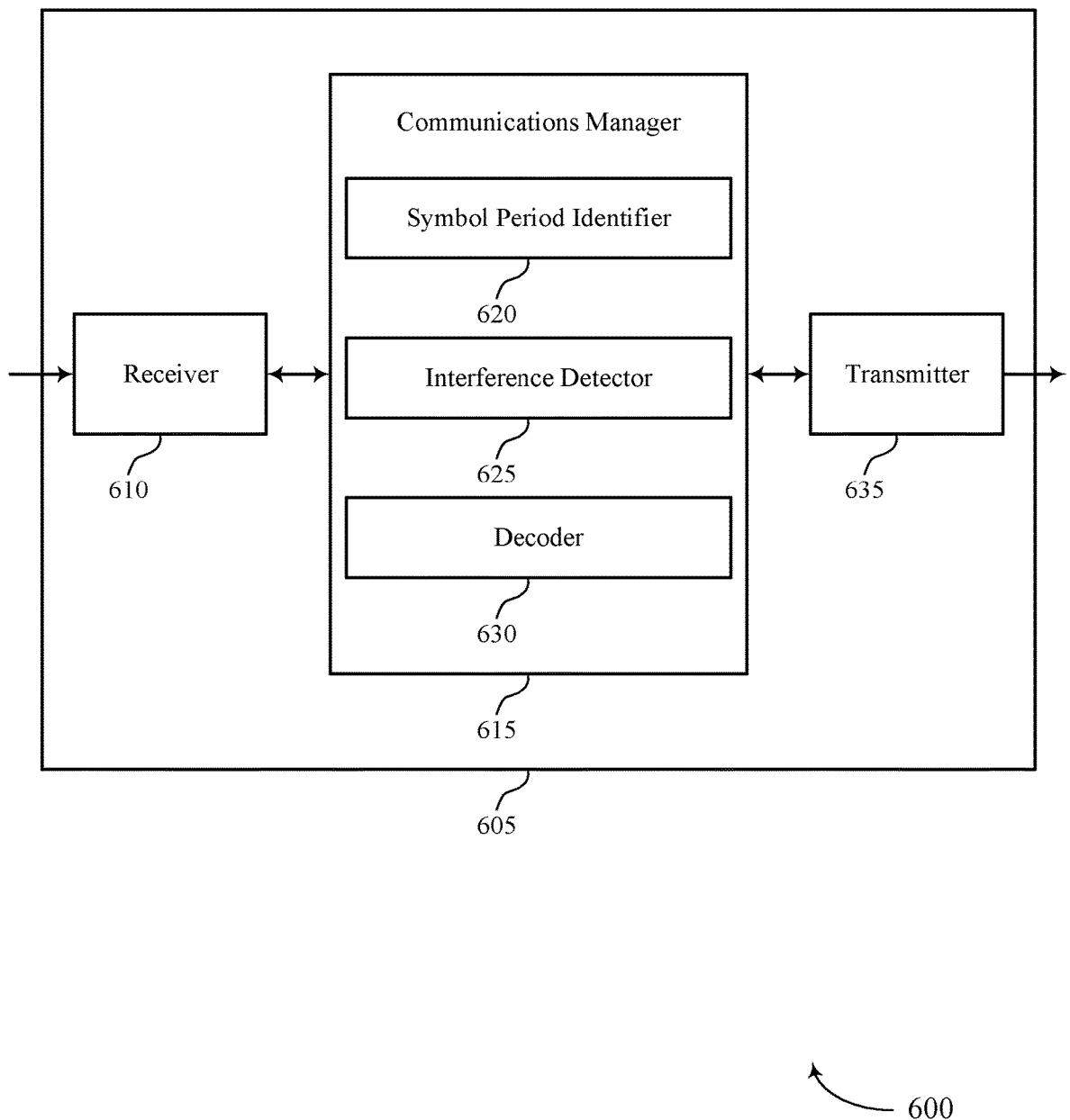

FIG. 6 shows a block diagram 600 of a device 605 that supports inter-radio access technology interference cancellation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to inter-radio access technology interference cancellation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a symbol period identifier 620, an interference detector 625, and a decoder 630. The communications manager 615 may be an example of aspects of the communications manager 810 described herein.

The symbol period identifier 620 may identify, within a first TTI, a symbol period in which a set of wireless devices operating in accordance with a cellular vehicle to everything (CV2X) RAT are configured to refrain from transmitting.

The interference detector 625 may measure interference of a second RAT during the symbol period, the second RAT differing from the CV2X RAT.

The decoder 630 may decode a CV2X waveform during the first TTI or a second TTI based on the measured interference.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Based on reducing computational complexity of interference cancellation (e.g., whitening), a processor of a UE 115 (e.g., controlling the receiver 610, the transmitter 635, or the transceiver 820 as described with reference to FIG. 8) may efficiently determine what the interference from non-CV2X RATs is on CV2X transmissions. Further, the processor of UE 115 may transmit reduce power consumption due to the reduced computational complexity. As such, the processor may avoid overheating.

Figure 7:
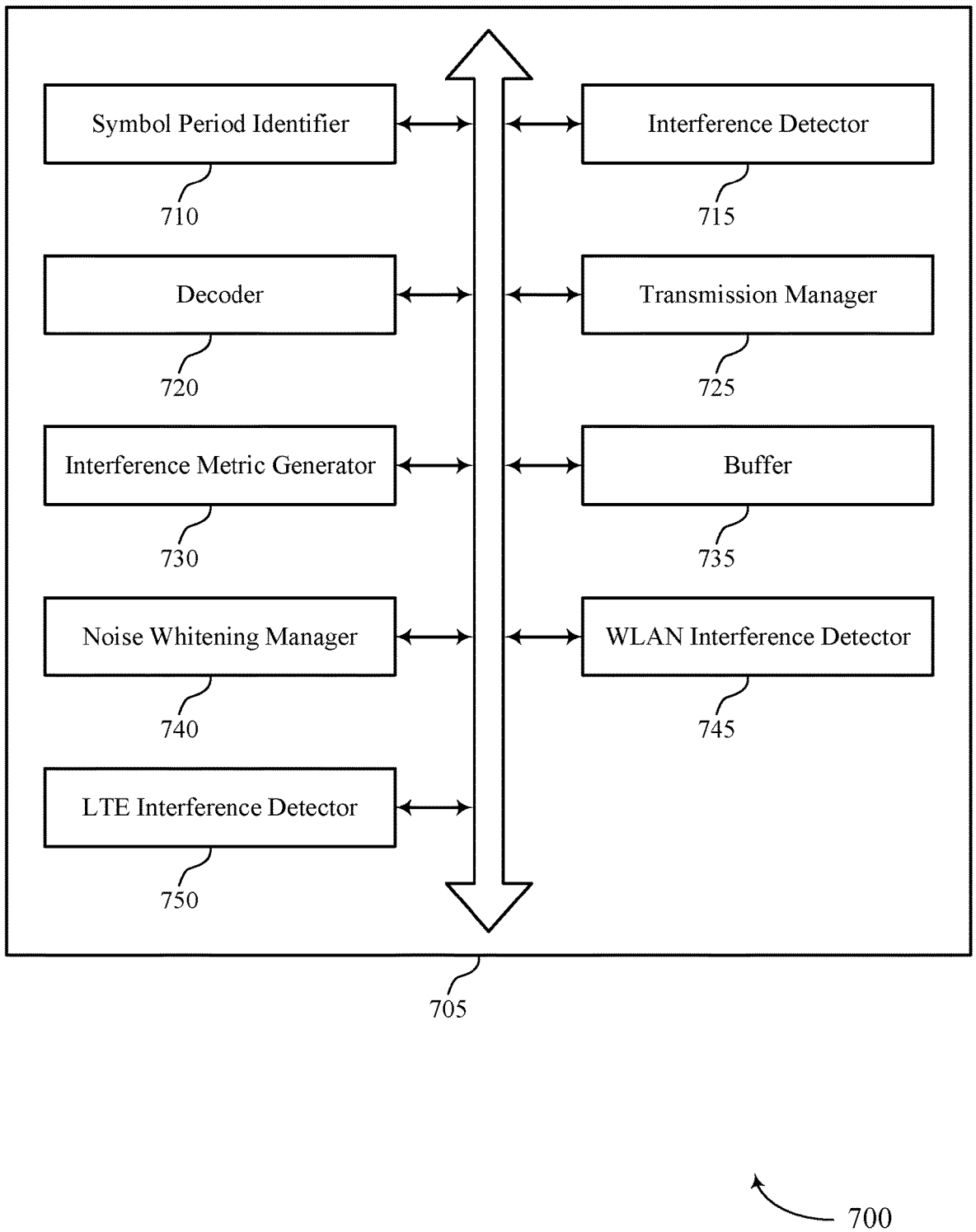
FIG. 7 shows a block diagram of a communications manager in accordance with aspects of the present disclosure.

FIG. 7 shows a block diagram 700 of a communications manager 705 that supports inter-radio access technology interference cancellation in accordance with aspects of the present disclosure. The communications manager 705 may be an example of aspects of a communications manager 515, a communications manager 615, or a communications manager 810 described herein. The communications manager 705 may include a symbol period identifier 710, an interference detector 715, a decoder 720, a transmission manager 725, an interference metric generator 730, a buffer 735, a noise whitening manager 740, a WLAN interference detector 745, and an LTE interference detector 750. Each of these modules may communicate, directly or indirectly, with one another (e.g., via one or more buses).

The symbol period identifier 710 may identify, within a first TTI, a symbol period in which a set of wireless devices operating in accordance with a cellular vehicle to everything (CV2X) RAT are configured to refrain from transmitting. In some examples, the symbol period identifier 710 may identify that the symbol period is a last symbol period of the first TTI, the first TTI including a set of symbol periods. In some cases, the first TTI is a subframe.

The interference detector 715 may measure interference of a second RAT during the symbol period, the second RAT differing from the CV2X RAT. In some examples, the interference detector 715 may generate, for the symbol period, a set of interference measurements using a set of antennas of the UE. In some examples, the interference detector 715 may generate an interference power measurement for the symbol period, where the CV2X waveform is decoded based on the interference power measurement. In some examples, the interference detector 715 may measure, for the symbol period, interference of at least one additional RAT, where the CV2X waveform is decoded based on the measured interference of the at least one additional RAT. In some examples, the interference detector 715 may measure interference within a second symbol period, where the CV2X waveform is decoded based on the interference measured within the second symbol period.

The decoder 720 may decode a CV2X waveform during the first TTI or a second TTI based on the measured interference. In some examples, the decoder 720 may decode the CV2X waveform in the second TTI that occurs after the first TTI based on the measured interference. In some examples, the decoder 720 may decode the CV2X waveform in the first TTI. In some cases, the second TTI occurs immediately after the first TTI. In some cases, at least one intervening TTI occurs between the first TTI and the second TTI.

The transmission manager 725 may identify a preconfiguration or receiving control signaling that configures the UE to refrain from transmitting during the symbol period.

The interference metric generator 730 may generate a covariance interference metric based on the set of interference measurements, where the CV2X waveform is decoded based on the covariance interference metric. In some examples, the interference metric generator 730 may generate a noise statistic, an interference statistic, or both, for the symbol period, where the CV2X waveform is decoded based on the noise statistic, the interference statistic, or both.

The buffer 735 may buffer samples of the CV2X waveform generated for a set of symbol periods of the first TTI that occur prior to the symbol period within the first TTI, where the CV2X waveform is received during the first TTI and decoded based on the buffered samples.

The noise whitening manager 740 may apply noise whitening processing to the CV2X waveform based at least in interference measurement.

The WLAN interference detector 745 may measure, during the symbol period, the interference of a WLAN RAT. The LTE interference detector 750 may measure, during the symbol period, the interference of an LTE RAT.

Figure 8:
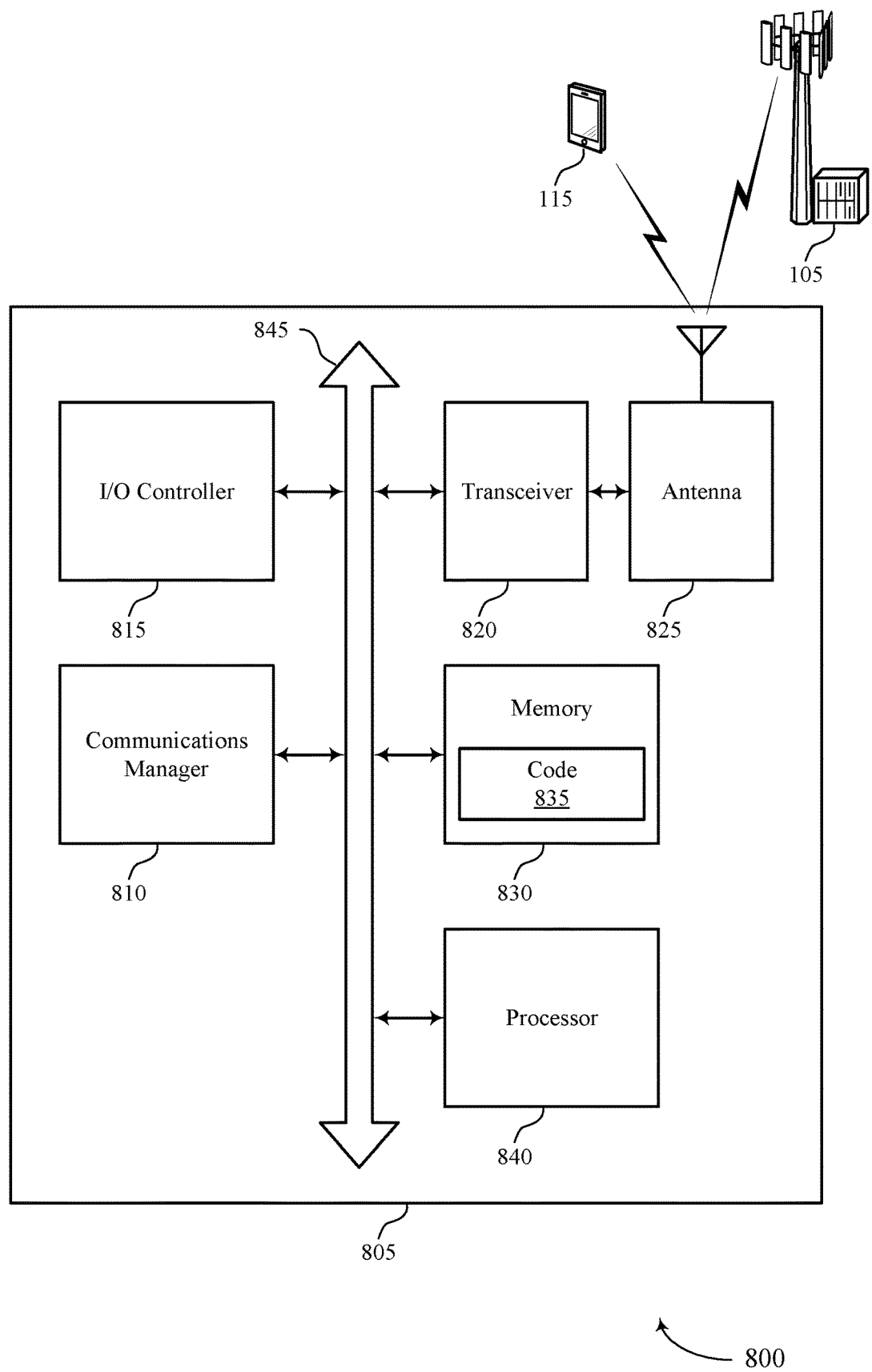
FIG. 8 shows a diagram of a system including a device in accordance with aspects of the present disclosure.

FIG. 8 shows a diagram of a system 800 including a device 805 that supports inter-radio access technology interference cancellation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify, within a first TTI, a symbol period in which a set of wireless devices operating in accordance with a cellular vehicle to everything (CV2X) RAT are configured to refrain from transmitting, measure interference of a second RAT during the symbol period, the second RAT differing from the CV2X RAT, and decode a CV2X waveform during the first TTI or a second TTI based on the measured interference.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input-output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting inter-radio access technology interference cancellation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
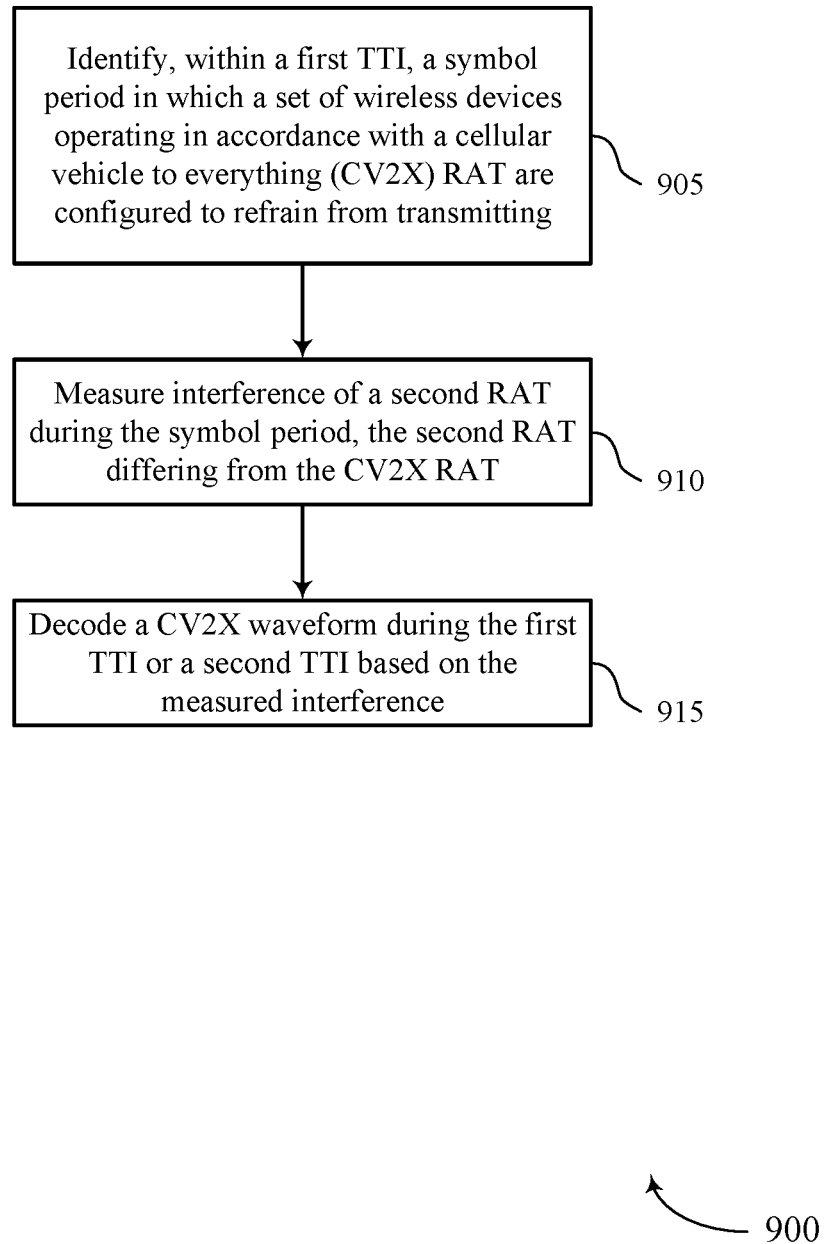
FIGS. 9 through 12 show flowcharts illustrating methods in accordance with aspects of the present disclosure.

FIG. 9 shows a flowchart illustrating a method 900 that supports inter-radio access technology interference cancellation in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may identify, within a first TTI, a symbol period in which a set of wireless devices operating in accordance with a cellular vehicle to everything (CV2X) RAT are configured to refrain from transmitting. The operations of 905 may be performed according to the methods described herein. In some examples, aspects of the operations of 905 may be performed by a symbol period identifier as described with reference to FIGS. 5 through 8.

At 910, the UE may measure interference of a second RAT during the symbol period, the second RAT differing from the CV2X RAT. The operations of 910 may be performed according to the methods described herein. In some examples, aspects of the operations of 910 may be performed by an interference detector as described with reference to FIGS. 5 through 8.

At 915, the UE may decode a CV2X waveform during the first TTI or a second TTI based on the measured interference. The operations of 915 may be performed according to the methods described herein. In some examples, aspects of the operations of 915 may be performed by a decoder as described with reference to FIGS. 5 through 8.

Figure 10:
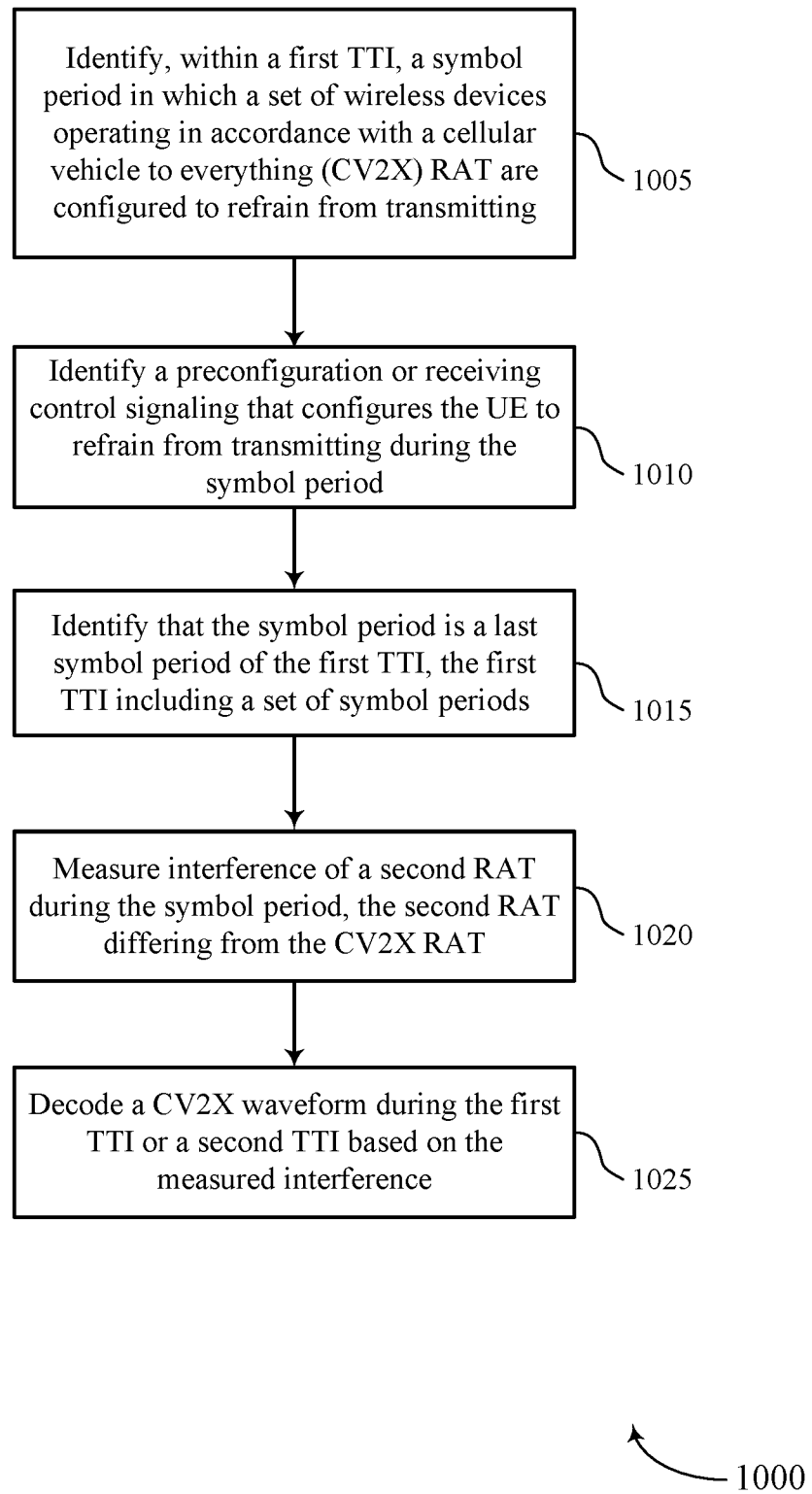

FIG. 10 shows a flowchart illustrating a method 1000 that supports inter-radio access technology interference cancellation in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may identify, within a first TTI, a symbol period in which a set of wireless devices operating in accordance with a cellular vehicle to everything (CV2X) RAT are configured to refrain from transmitting. The operations of 1005 may be performed according to the methods described herein. In some examples, aspects of the operations of 1005 may be performed by a symbol period identifier as described with reference to FIGS. 5 through 8.

At 1010, the UE may identify a preconfiguration or receiving control signaling that configures the UE to refrain from transmitting during the symbol period. The operations of 1010 may be performed according to the methods described herein. In some examples, aspects of the operations of 1010 may be performed by a transmission manager as described with reference to FIGS. 5 through 8.

At 1015, the UE may identify that the symbol period is a last symbol period of the first TTI, the first TTI including a set of symbol periods. The operations of 1015 may be performed according to the methods described herein. In some examples, aspects of the operations of 1015 may be performed by a symbol period identifier as described with reference to FIGS. 5 through 8.

At 1020, the UE may measure interference of a second RAT during the symbol period, the second RAT differing from the CV2X RAT. The operations of 1020 may be performed according to the methods described herein. In some examples, aspects of the operations of 1020 may be performed by an interference detector as described with reference to FIGS. 5 through 8.

At 1025, the UE may decode a CV2X waveform during the first TTI or a second TTI based on the measured interference. The operations of 1025 may be performed according to the methods described herein. In some examples, aspects of the operations of 1025 may be performed by a decoder as described with reference to FIGS. 5 through 8.

Figure 11:
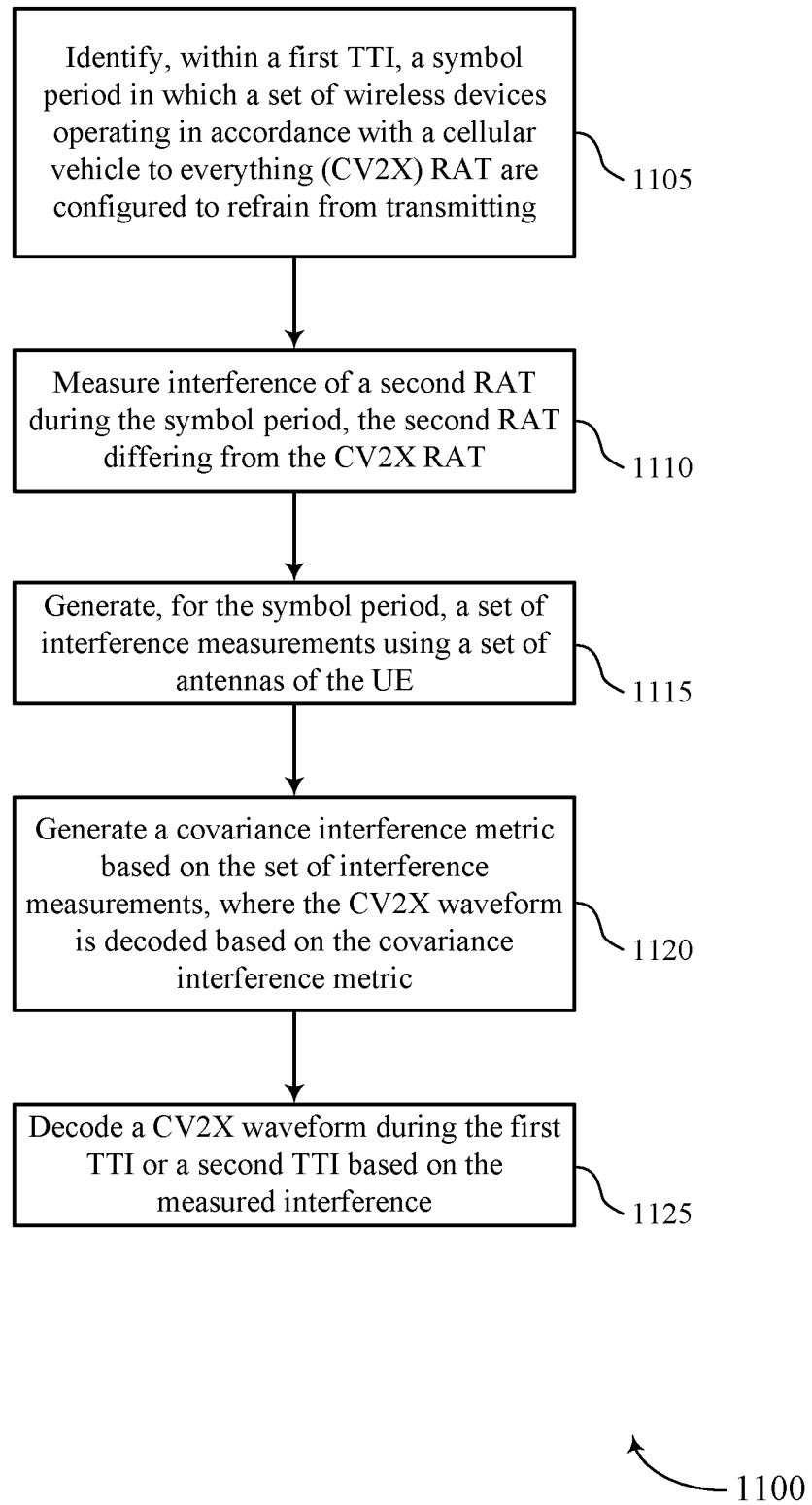

FIG. 11 shows a flowchart illustrating a method 1100 that supports inter-radio access technology interference cancellation in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may identify, within a first TTI, a symbol period in which a set of wireless devices operating in accordance with a cellular vehicle to everything (CV2X) RAT are configured to refrain from transmitting. The operations of 1105 may be performed according to the methods described herein. In some examples, aspects of the operations of 1105 may be performed by a symbol period identifier as described with reference to FIGS. 5 through 8.

At 1110, the UE may measure interference of a second RAT during the symbol period, the second RAT differing from the CV2X RAT. The operations of 1110 may be performed according to the methods described herein. In some examples, aspects of the operations of 1110 may be performed by an interference detector as described with reference to FIGS. 5 through 8.

At 1115, the UE may generate, for the symbol period, a set of interference measurements using a set of antennas of the UE. The operations of 1115 may be performed according to the methods described herein. In some examples, aspects of the operations of 1115 may be performed by an interference detector as described with reference to FIGS. 5 through 8.

At 1120, the UE may generate a covariance interference metric based on the set of interference measurements, where the CV2X waveform is decoded based on the covariance interference metric. The operations of 1120 may be performed according to the methods described herein. In some examples, aspects of the operations of 1120 may be performed by an interference metric generator as described with reference to FIGS. 5 through 8.

At 1125, the UE may decode a CV2X waveform during the first TTI or a second TTI based on the measured interference. The operations of 1125 may be performed according to the methods described herein. In some examples, aspects of the operations of 1125 may be performed by a decoder as described with reference to FIGS. 5 through 8.

Figure 12:
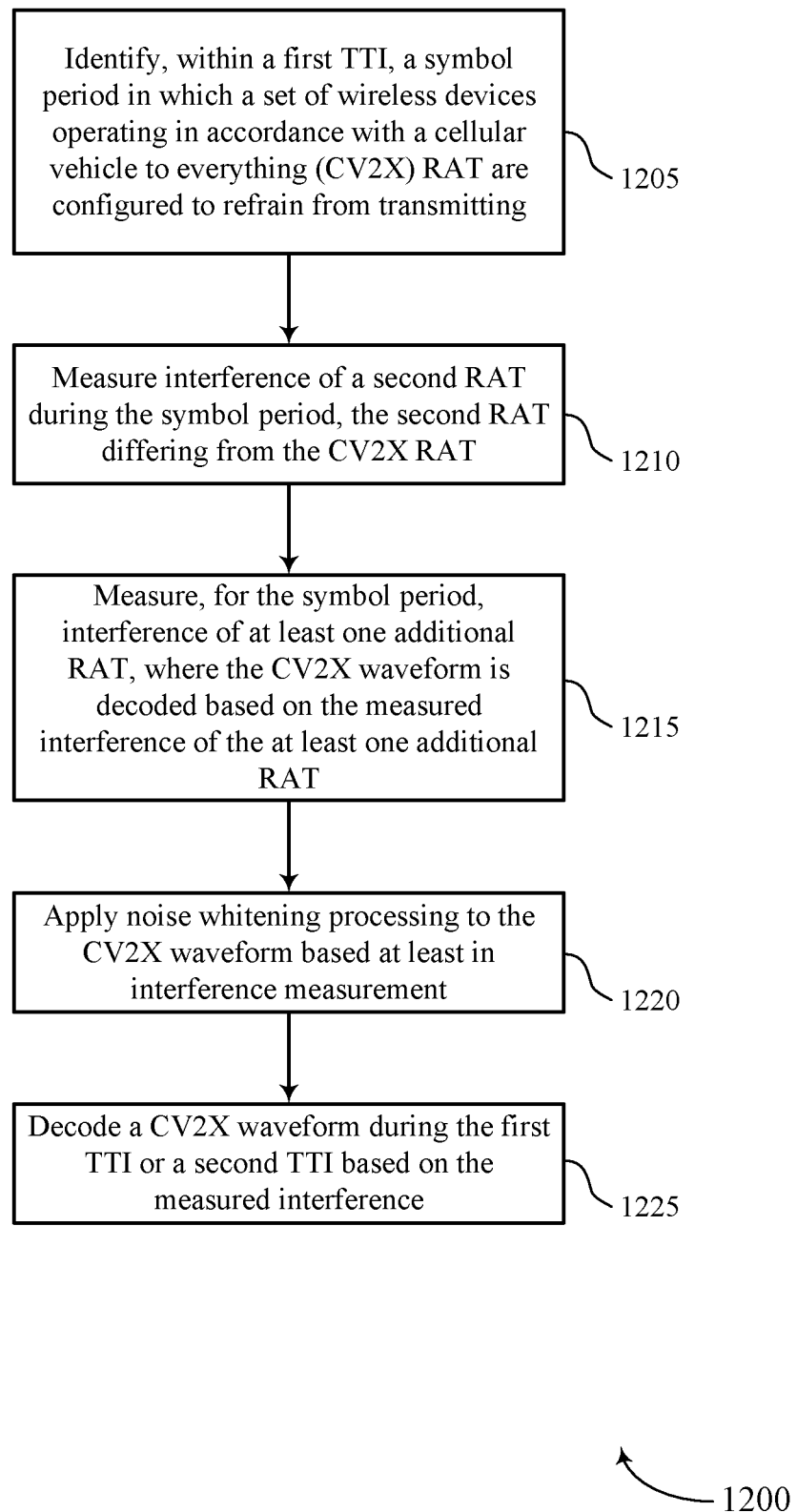

FIG. 12 shows a flowchart illustrating a method 1200 that supports inter-radio access technology interference cancellation in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1205, the UE may identify, within a first TTI, a symbol period in which a set of wireless devices operating in accordance with a cellular vehicle to everything (CV2X) RAT are configured to refrain from transmitting. The operations of 1205 may be performed according to the methods described herein. In some examples, aspects of the operations of 1205 may be performed by a symbol period identifier as described with reference to FIGS. 5 through 8.

At 1210, the UE may measure interference of a second RAT during the symbol period, the second RAT differing from the CV2X RAT. The operations of 1210 may be performed according to the methods described herein. In some examples, aspects of the operations of 1210 may be performed by an interference detector as described with reference to FIGS. 5 through 8.

At 1215, the UE may measure, for the symbol period, interference of at least one additional RAT, where the CV2X waveform is decoded based on the measured interference of the at least one additional RAT. The operations of 1215 may be performed according to the methods described herein. In some examples, aspects of the operations of 1215 may be performed by an interference detector as described with reference to FIGS. 5 through 8.

At 1220, the UE may apply noise whitening processing to the CV2X waveform based at least in interference measurement. The operations of 1220 may be performed according to the methods described herein. In some examples, aspects of the operations of 1220 may be performed by a noise whitening manager as described with reference to FIGS. 5 through 8.

At 1225, the UE may decode a CV2X waveform during the first TTI or a second TTI based on the measured interference. The operations of 1225 may be performed according to the methods described herein. In some examples, aspects of the operations of 1225 may be performed by a decoder as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:
    identifying, within a first transmission time interval (TTI), a symbol period in which a set of wireless devices operating in accordance with a cellular vehicle to everything (CV2X) radio access technology (RAT) are configured to refrain from transmitting;
    measuring interference of a second RAT during the symbol period, the second RAT differing from the CV2X RAT; and
    decoding a CV2X waveform during the first TTI or a second TTI based at least in part on the measured interference.

2. The method of claim 1, wherein identifying the symbol period comprises:
    identifying a preconfiguration or receiving control signaling that configures the UE to refrain from transmitting during the symbol period.

3. The method of claim 1, wherein identifying the symbol period comprises:
    identifying that the symbol period is a last symbol period of the first TTI, the first TTI comprising a plurality of symbol periods.

4. The method of claim 1, wherein measuring the interference comprises:
    generating, for the symbol period, a plurality of interference measurements using a plurality of antennas of the UE; and
    generating a covariance interference metric based at least in part on the plurality of interference measurements, wherein the CV2X waveform is decoded based at least in part on the covariance interference metric.

5. The method of claim 1, further comprising:
    buffering samples of the CV2X waveform generated for a plurality of symbol periods of the first TTI that occur prior to the symbol period within the first TTI, wherein the CV2X waveform is received during the first TTI and decoded based at least in part on the buffered samples.

6. The method of claim 1, wherein measuring the interference comprises:
    generating an interference power measurement for the symbol period, wherein the CV2X waveform is decoded based at least in part on the interference power measurement.

7. The method of claim 1, wherein measuring the interference comprises:
    generating a noise statistic, an interference statistic, or both, for the symbol period, wherein the CV2X waveform is decoded based at least in part on the noise statistic, the interference statistic, or both.

8. The method of claim 1, wherein decoding the CV2X waveform comprises:
    decoding the CV2X waveform in the second TTI that occurs after the first TTI based at least in part on the measured interference.

9. The method of claim 8, wherein the second TTI occurs immediately after the first TTI.

10. The method of claim 8, wherein at least one intervening TTI occurs between the first TTI and the second TTI.

11. The method of claim 1, wherein decoding the CV2X waveform comprises:
    applying noise whitening processing to the CV2X waveform based at least in interference measurement.

12. The method of claim 1, wherein decoding the CV2X waveform comprises:
    decoding the CV2X waveform in the first TTI.

13. The method of claim 1, wherein measuring the interference comprises:
    measuring, for the symbol period, interference of at least one additional RAT, wherein the CV2X waveform is decoded based at least in part on the measured interference of the at least one additional RAT.

14. The method of claim 1, further comprising:
    measuring interference within a second symbol period, wherein the CV2X waveform is decoded based at least in part on the interference measured within the second symbol period.

15. The method of claim 1, wherein measuring the interference comprises:
    measuring, during the symbol period, the interference of a wireless local area network (WLAN) RAT.

16. The method of claim 1, wherein measuring the interference comprises:
    measuring, during the symbol period, the interference of a Long Term Evolution (LTE) RAT.

17. The method of claim 1, wherein the first TTI is a subframe.

18. An apparatus for wireless communications by a user equipment (UE), comprising:
    a processor,
    memory coupled with the processor; and
    instructions stored in the memory and executable by the processor to cause the apparatus to:
        identify, within a first transmission time interval (TTI), a symbol period in which a set of wireless devices operating in accordance with a cellular vehicle to everything (CV2X) radio access technology (RAT) are configured to refrain from transmitting;
        measure interference of a second RAT during the symbol period, the second RAT differing from the CV2X RAT; and decode a CV2X waveform during the first TTI or a second TTI based at least in part on the measured interference.

19. The apparatus of claim 18, further comprising a decoder, wherein the instructions to decode the CV2X waveform are executable by the processor to cause the apparatus to:
configure the decoder to decode the CV2X waveform during the first TTI or the second TTI based at least in part on the measured interference.

20. The apparatus of claim 18, wherein the instructions to identify the symbol period are executable by the processor to cause the apparatus to:
identify a preconfiguration or receiving control signaling that configures the UE to refrain from transmitting during the symbol period.

21. The apparatus of claim 18, wherein the instructions to identify the symbol period are executable by the processor to cause the apparatus to:
identify that the symbol period is a last symbol period of the first TTI, the first TTI comprising a plurality of symbol periods.

22. The apparatus of claim 18, wherein the instructions to measure the interference are executable by the processor to cause the apparatus to:
generate, for the symbol period, a plurality of interference measurements using a plurality of antennas of the UE; and
generate a covariance interference metric based at least in part on the plurality of interference measurements, wherein the CV2X waveform is decoded based at least in part on the covariance interference metric.

23. The apparatus of claim 18, wherein the instructions are further executable by the processor to cause the apparatus to:
buffer samples of the CV2X waveform generated for a plurality of symbol periods of the first TTI that occur prior to the symbol period within the first TTI, wherein the CV2X waveform is received during the first TTI and decoded based at least in part on the buffered samples.

24. The apparatus of claim 18, wherein the instructions to measure the interference are executable by the processor to cause the apparatus to:
generate an interference power measurement for the symbol period, wherein the CV2X waveform is decoded based at least in part on the interference power measurement.

25. The apparatus of claim 18, wherein the instructions to measure the interference are executable by the processor to cause the apparatus to:
generate a noise statistic, an interference statistic, or both, for the symbol period, wherein the CV2X waveform is decoded based at least in part on the noise statistic, the interference statistic, or both.

26. The apparatus of claim 18, wherein the instructions to decode the CV2X waveform are executable by the processor to cause the apparatus to:
decode the CV2X waveform in the second TTI that occurs after the first TTI based at least in part on the measured interference.

27. The apparatus of claim 18, wherein the instructions to measure the interference are executable by the processor to cause the apparatus to:
measure, for the symbol period, interference of at least one additional RAT, wherein the CV2X waveform is decoded based at least in part on the measured interference of the at least one additional RAT.

28. The apparatus of claim 18, wherein the instructions are further executable by the processor to cause the apparatus to:
measure interference within a second symbol period, wherein the CV2X waveform is decoded based at least in part on the interference measured within the second symbol period.

29. An apparatus for wireless communications by a user equipment (UE), comprising:
means for identifying, within a first transmission time interval (TTI), a symbol period in which a set of wireless devices operating in accordance with a cellular vehicle to everything (CV2X) radio access technology (RAT) are configured to refrain from transmitting;
means for measuring interference of a second RAT during the symbol period, the second RAT differing from the CV2X RAT; and
means for decoding a CV2X waveform during the first TTI or a second TTI based at least in part on the measured interference.

30. A non-transitory computer-readable medium storing code for wireless communications by a user equipment (UE), the code comprising instructions executable by a processor to:
identify, within a first transmission time interval (TTI), a symbol period in which a set of wireless devices operating in accordance with a cellular vehicle to everything (CV2X) radio access technology (RAT) are configured to refrain from transmitting;
measure interference of a second RAT during the symbol period, the second RAT differing from the CV2X RAT; and
decode a CV2X waveform during the first TTI or a second TTI based at least in part on the measured interference.

* * * * *